Figures 1, 2:
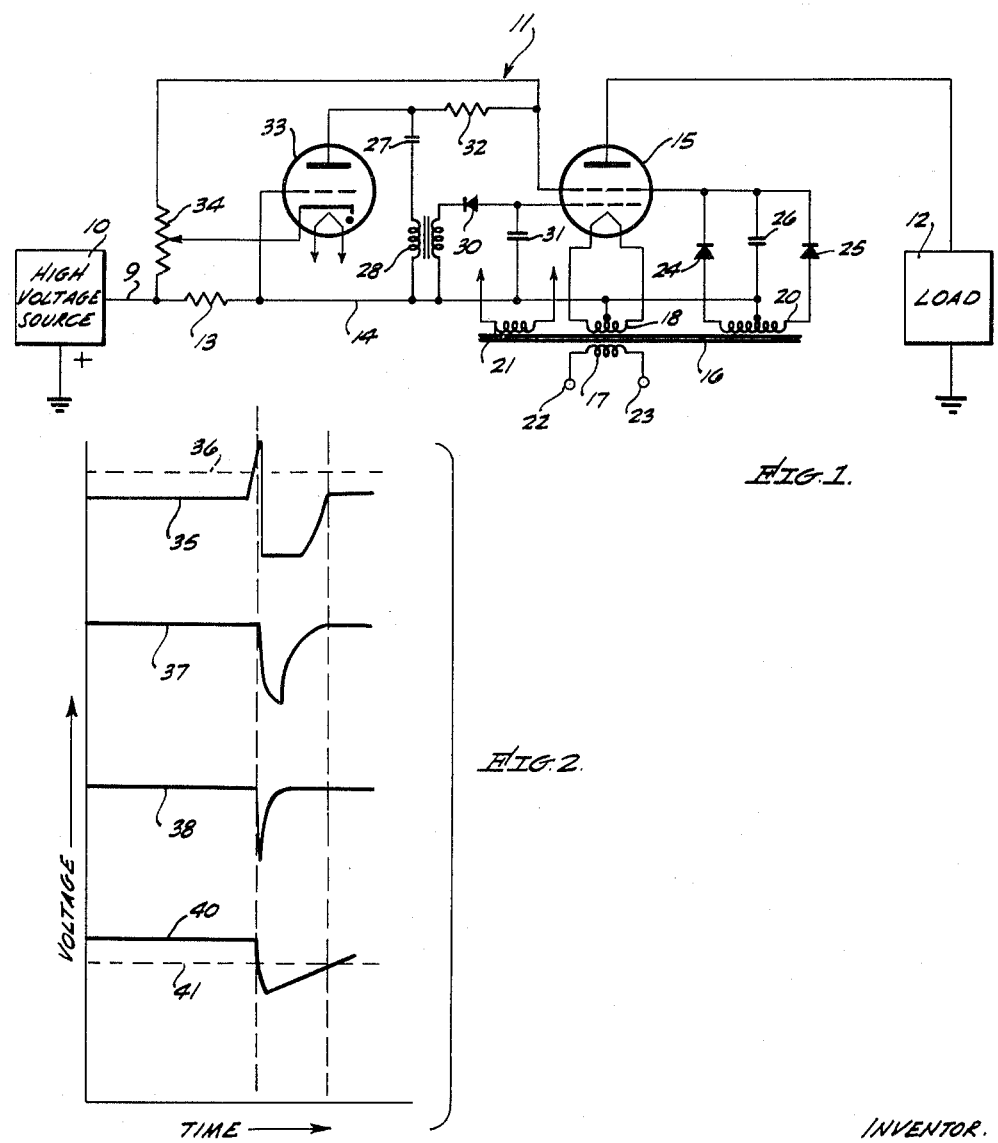

May 18, 1965

H. R. SCHULTZ, SR 3,184,643

HIGH VOLTAGE CONTROL CIRCUIT

Filed Dec. 20, 1961

INVENTOR.
HAROLD R. SCHULTZ SR.,
BY
Noel B. Hammond

AGENT.

United States Patent Office 3,184,643
Patented May 18, 1965

3,184,643
HIGH VOLTAGE CONTROL CIRCUIT
Harold R. Schultz, Sr., Los Angeles, Calif., assignor to Hughes Aircraft Company, Culver City, Calif., a corporation of Delaware
Filed Dec. 20, 1961, Ser. No. 160,863
6 Claims. (Cl. 317—22)

The present invention relates to overload protection circuits and, more particularly, to a circuit for immediate interruption of the flow of current from a high voltage source to a load during an overload condition such as a short circuit or arc that results in current exceeding a predetermined safe amount.

High voltages are often required in electronic equipment, for example in connection with the biasing of traveling wave tubes or klystrons. In the event of an abnormal condition, such as a short circuit or arc in a traveling wave tube, the tube can be destroyed in a very short period of time unless the flow of current from the high voltage source is immediately interrupted. It is thus necessary to provide an overload protection control circuit that interrupts the current to the load from the high voltage source in a very short time without arcing in the event of an overload but which does not adversely affect the normal flow of current required by the load.

Many of the prior art circuits for overload protection are too slow in operation or unreliable to provide adequate protection to some electronic devices against short circuits and arcing conditions at very high voltages. Also, many switching circuits of the prior art are expensive, bulky and unreliable because of the large number of parts subject to failure. Relays are often used to provide overload protection but relay devices have an inherent limit on the minimum time in which they can disconnect a load from a high voltage source. A physically large relay is required to interrupt high voltages and currents, resulting in a long transit time of the mechanically moving parts from the closed to the open position.

Fuse devices are relatively slow because of the time required to melt the fuse material and because of the long arc developed in disconnecting a high voltage. Also, a fuse does not permit power to be automatically reapplied after the termination of a momentary overload condition.

Some high voltage control circuits utilize a gaseous discharge device such as a thyratron tube connected in parallel with the load to provide a low impedance shunt path for current from the high voltage source when an overload condition occurs. The thyratron rapidly discharges a storage capacitor in the high voltage source to temporarily reduce the high voltage. Such high voltage control circuits are limited to use with sources of only moderately high voltages because of the maximum voltage which thyratron tubes will withstand without inadvertent ionization.

Accordingly, it is an object of the present invention to provide a simple, small high voltage control circuit that immediately interrupts the current from a high voltage source to a load without arcing when the current supplied to the load exceeds a predetermined safe amount and which automatically resets itself after a predetermined time.

In accordance with these and other objects of the invention, there is provided a high vacuum electron tube connected in series between a high voltage source and a load. The vacuum tube is normally conductive and the normal current provided to the load passes therethrough. A gas-filled electron discharge tube or thyratron has a control potential applied thereto that is derived from the current to the load. When the current supplied to the load exceeds a predetermined safe amount, the control potential rises to the value at which the thyratron ionizes and discharges a capacitor through the primary winding of an induction coil. The secondary winding of the induction coil develops a high potential impulse that is applied to the control grid of the vacuum tube as a negative bias rendering the tube nonconductive, thereby interrupting the flow of current to the load from the high voltage source. A capacitor in the grid circuit of the vacuum tube rapidly charges to a potential sufficient to maintain the tube nonconductive after termination of the impulse. When a sufficient amount of the charge has leaked off the capacitor, the vacuum tube again becomes conductive and passes normal current to the load.

The following specification and the accompanying drawing describe and illustrate an exemplification of the present invention. Consideration of the specification and drawing will provide a complete understanding of the invention, including the novel features and objects thereof.

FIG. 1 of the drawing is a schematic circuit diagram of an embodiment of a high voltage control circuit constructed in accordance with the present invention; and
FIG. 2 is a graph of waveforms of voltages appearing in the circuit of FIG. 1.

Referring now to the drawing, there is provided a high voltage source 10 which may be a conventional electronic power supply and may include a storage capacitor connected in parallel across the output terminals thereof. The source 10 is connected by a high voltage control circuit 11 to a load 12, which may be a circuit including a traveling wave tube or klystron, for example. With grid-controlled traveling wave tubes, the high voltage is applied from an anode and collector to a cathode. A control grid is provided in grid-controlled traveling wave tubes so that pulsed operation may be obtained by pulsing the grid at a relatively low voltage, thus saving the weight of modulating equipment to pulse the voltage between the anode and the cathode. Because of the presence of the grid, short circuits or arcs are especially prevalent between the grid and anode of this type of traveling wave tube. Thus, a high voltage control circuit to temporarily interrupt the flow of current from the high voltage source, thereby eliminating or suppressing an arc, is especially necessary to protect grid controlled traveling wave tubes from damage. The high voltage source 10 of the present example supplies a potential on the order of 50,000 volts at a current of 250 milliamperes.

The current path through the high voltage control circuit 11 is from the negative terminal 9 of the high voltage source 10, through a resistor 13 to a common conductor 14, through a high vacuum tube 15, and from thence to the load 12. The return path from the load 12 to the positive terminal of the high voltage source 10 is indicated schematically by the ground symbols. The high voltage control circuit 11 is suitably insulated from the return path to prevent leakage or arc-over. The vacuum tube 15 may be of the transmitter power amplifier type that has the ability to conduct a heavy current at low plate voltage and yet can withstand a high voltage across it while conducting little or no current. The vacuum tube 15 is, in the present example, a tetrode transmitter power amplifier tube type 4PR250C, manufactured by Eitel-McCullough, Inc. of San Carlos, California.

The operating potentials for the high voltage control circuit 11 are provided by a power transformer 16 having a primary winding 17 and three secondary windings 18, 20 and 21. The primary winding 17 is connected at two terminals 22, 23 to the alternating current supply lines. A filament winding 18 is connected to the filament of the vacuum tube 15 and has a center tap connected to the common conductor 14. A high voltage winding 20 having a center tap is connected with two diodes 24, 25 and a filter capacitor 26 in a full-wave rectifier power supply circuit. The high voltage winding 20 provides a voltage after rectification and filtering, of 500 volts, in the present example. The center tap of the high voltage winding 20, which is the negative terminal of the full-wave rectifier power supply is connected to the common conductor 14. The anode of each of the diodes 24, 25 is connected to a different end of the high voltage winding 20, and the cathodes, which form the positive terminal of the power supply, are connected to the screen grid of the vacuum tube 15. The filter capacitor 26 is connected from the cathodes of the diodes 24, 25 to the common conductor 14.

Under overload conditions, the vacuum tube 15 is caused to become nonconductive by the discharge of a capacitor 27 through the primary winding of an induction coil 28. The secondary winding of the induction coil 28 develops a high potential impulse, which is coupled by a diode 30 as a negative grid bias applied between the control grid of the high vacuum tube 15 and the common conductor 14, which renders the tube 15 nonconductive. This interrupts the flow of current from the high voltage source 10 to the load 12. A capacitor 31 is connected between the control grid of the vacuum tube 15 and the common conductor 14 and charges rapidly when the high potential impulse is applied thereto. The diode 30 is connected in series between one end of the secondary winding of the induction coil 28 and the control grid of the tube 15 with the cathode of the diode 30 connected to the coil 28 and the anode connected to the grid and provides unilateral conduction and thereby prevents discharge of the capacitor 31 through the induction coil 28, oscillation in the secondary circuit, or the grid of the tube 15 going positive. The diode 30 has a high peak inverse voltage rating and a low reverse current rating. A type 1N2328 semiconductor diode manufactured by the Western Electric Co. or a type 6X4 high vacuum rectifier will be found satisfactory. The charge on the capacitor 31 maintains the control grid of the vacuum tube 15 at a sufficiently negative potential with respect to the filament to maintain the tube 15 nonconductive after the termination of the impulse. This potential is on the order of 750 volts for control of high voltages on the order of 50,000 volts. The only discharge path for the capacitor 31 is through the leakage resistance of the circuit. The capacitor 31 is of the silver mica type having a high temperature wax coating to minimize the leakage resistance. The induction coil 28 is, in the present example, an automobile ignition coil which develops a voltage across the secondary winding on the order of 10,000 volts under open circuit conditions. The use of the induction coil 28 permits immediate cutoff of the vacuum tube 15 and permits the capacitor 31 to charge to 750 volts in a short time interval.

The primary winding of the induction coil 28, the associated capacitor 27 and a resistor 32 are connected in series in the order named across the terminals of the full-wave rectifier power supply, with the induction coil 28 connected to the common conductor 14 and the resistor 32 connected to the screen grid of the vacuum tube 15. The capacitor 27 charges through the resistor 32 and induction coil 28 to the potential of the power supply. A thyratron 33 is provided to discharge the capacitor 27 through the primary winding of the induction coil 28 when the current supplied to the load 12 exceeds a predetermined safe amount.

The thyratron 33 is controlled by a control potential developed across the resistor 13 in the current path between the high voltage source 10 and the load 12 in response to the current flowing therethrough. The grid to the thyratron 33 is connected to the common conductor 14 on the load side of the resistor 13 while the cathode of the thyratron 33 is connected by a potentiometer 34 to the source side of the resistor 13. The potentiometer 34 is connected in series with the resistor 13 across the full-wave rectifier power supply, the potentiometer 34 having one end connected to the source side of the resistor 13 and the other end connected to the screen grid of the vacuum tube 15. The movable contact of the potentiometer 34 is connected to the cathode of the thyratron 33 and permits the grid bias of the thyratron 33 to be adjusted, thereby predetermining the control potential at which the thyratron 33 ionizes. The heater of the thyratron 33 is connected to the remaining secondary winding 21 of the power transformer 16, as indicated by the arrows. The anode of the thyratron 33 is connected to the junction between the capacitor 27 in the primary circuit of the induction coil 28 and the resistor 32. Thus, the thyratron 33, when ionized, discharges the capacitor 27 through the primary winding of the induction coil 28.

The operation of the high voltage control circuit 11 of FIG. 1 will be described in connection with the waveform diagram of FIG. 2. The first waveform 35 represents the control potential appearing at the grid of the thyratron 33 with respect to the cathode. The horizontal dashed line 36 indicates the level at which the thyratron 33 ionizes. The second waveform 37 represents the voltage at the resistor end of the capacitor 27 in the primary circuit of the induction coil 28 with respect to the common conductor 14. The third waveform 38 represents the voltage at the diode end of the secondary winding of the induction coil 28 with respect to the common conductor 14 and the fourth waveform 40 represents the voltage at the grid of the vacuum tube 15 with respect to the filament. The horizontal dashed line 41 associated with the fourth waveform 40 indicates the level at which the vacuum tube 15 becomes nonconductive.

In operation, normal current flows from the high voltage source 10 through the resistor 13, the common conductor 14 and the vacuum tube 15 to the load 12. This results in a control potential appearing at the grid of the thyratron 33 due to the voltage drop across the resistor 13, as indicated by the horizontal portion of the first waveform 35 at a level less than the ionization level indicated by the dashed line 36. FIG. 2 illustrates waveforms occurring in the circuit of FIG. 1 after the circuit 11 has been in operation for some time supplying a steady or average current to the load 12. Hence, the initial horizontal portion of the first waveform 35 is also representative of the normal steady state current supplied to the load 12. The capacitor 27 in the primary circuit of the induction coil 28 is charged to the voltage produced by the full-wave rectifier power supply, as indicated by the horizontal portion of the second waveform 37. When an overload condition occurs in the load 12 resulting in current exceeding a predetermined safe amount being supplied to the load 12, as due to a short circuit or arc-over, the voltage dropped across the resistor 13 rises suddenly, causing the control potential at the grid of the thyratron 33 to have a sharp spike that exceeds the ionization level of the thyratron, as indicated by the first waveform 35. The thyratron 33 becomes conductive and discharges the capacitor 27 in the primary circuit of the induction coil 28 through the primary winding thereof as indicated by the falling portion of the second waveform 37. As this happens, a high potential impulse appears at the secondary winding of the induction coil 28 as indicated by the third waveform 38. The capacitor 31 in the grid circuit of the vacuum tube 15 charges rapidly toward the peak of the high potential impulse, reaching a potential exceeding the level at which the tube 15 becomes nonconductive before the termination of the impulse, as indicated by the fourth waveform 40. The vacuum tube 15 becomes nonconductive, thereby interrupting the flow of current to the load 12 from the high voltage source 10.

The time of operation of the high voltage control circuit 11 of the present invention is on the order of 1 microsecond. The limit on the minimum time of operation is imposed by the thyratron 33 which does not ionize instantaneously.

After the discharge of the capacitor 27 in the primary circuit of the induction coil 28, the lowered potential at the anode of the thyratron 33 in conjunction with the decreased control potential at the grid thereof, permits the thyratron 33 to de-ionize. The capacitor 27 in the primary circuit of the induction coil 28 then recharges, as indicated by the exponentially rising portion of the second waveform 37. The capacitor 31 in the grid circuit of the vacuum tube 15 slowly discharges through its leakage resistance until the vacuum tube 15 again becomes conductive, at which time the normal flow of current from the high voltage source 10 to the load 12 is reestablished. The high voltage control circuit 11 has now reset itself automatically and is ready for the occurrence of the next short circuit or arc-over at the load 12.

Thus, there has been described a simple and small high voltage control circuit that immediately interrupts the flow of current from a high voltage source to a load without arcing when an overload occurs and thereafter automatically resets itself.

While only one embodiment of the invention has been shown and described, modification may be made and it is intended in the appended claims to cover all such modifications as may fall within the true spirit and scope of the invention.

What is claimed is:

1. A control circuit comprising:
   (a) a high vacuum electron discharge device having a cathode, an anode and a control electrode, said device being normally conductive to provide a current path between the cathode and anode thereof, said device being responsive to a negative signal applied to the control electrode thereof to become nonconductive to interrupt said current path;
   (b) an induction coil having a primary winding and a secondary winding, said secondary winding having a first terminal connected to the cathode of said device and a second terminal connected through unilaterally conductive means to the control electrode of said device, said unilaterally conductive means being poled to provide a negative signal at the control electrode of said device;
   (c) means coupled to said current path and coupled to the primary winding of said induction coil and being responsive to a predetermined current through said current path for momentarily energizing the primary winding of said induction coil;
   (d) and means coupled to the control electrode of said device for maintaining said negative signal thereat for a predetermined length of time following the application of said negative signal thereto.

2. A control circuit comprising:
   (a) a high vacuum electron discharge device having a cathode, an anode and a control electrode, said device being normally conductive to provide a current path between the cathode and anode thereof, said device being responsive to a negative signal applied to the control electrode thereof to become nonconductive to interrupt said current path;
   (b) An induction coil having a primary winding and a secondary winding, said secondary winding having a first terminal connected to the cathode of said device and a second terminal connected through unilaterally conductive means to the control electrode of said device, said unilaterally conductive means being poled to provide a negative signal at the control electrode of said device;
   (c) means associated with said current path for providing a voltage in response to current flow therein;
   (d) means coupled to said means for providing a voltage and coupled to the primary winding of said induction coil and being responsive to a predetermined voltage developed by said means for providing a voltage for momentarily energizing the primary winding of said induction coil;
   (e) and means coupled to the control electrode of said device for maintaining said negative signal thereat for a predetermined length of time following the application of said negative signal thereto.

3. A control circuit comprising:
   (a) a high vacuum electron discharge device having a cathode, an anode and a control electrode, said device being normally conductive to provide a current path between the cathode and anode thereof, said device being responsive to a negative signal applied to the control electrode thereof to become nonconductive to interrupt said current path;
   (b) means associated with said current path for providing a voltage in response to current flow therein;
   (c) electronic switch means having a first terminal, a second terminal and a control terminal, said switch means being normally nonconductive, the control terminal thereof being coupled to said means for providing a voltage, said switch means being responsive to a predetermined voltage applied to the control terminal thereof to conduct current from the first terminal thereof to the second terminal thereof;
   (d) an induction coil having a primary winding and a secondary winding, said primary winding having a first terminal connected to the first terminal of said switch means, said secondary winding having a first terminal connected to the cathode of said device and a second terminal connected through a diode to the control electrode of said device, said diode being poled to provide a negative signal at the control electrode of said device;
   (e) means for storing an electrical charge connected from the first terminal of said switch means to a second terminal of said primary winding;
   (f) means coupled to said means for storing a charge for providing a charging potential thereto;
   (g) and means coupled to the control electrode of said device for maintaining said negative signal thereat for a predetermined length of time following the application of said negative signal thereto.

4. A control circuit circuit comprising:
   (a) a high vacuum electron discharge device having a cathode, an anode and a control electrode, said device being normally conductive to provide a current path between the cathode and anode thereof, said device being responsive to a negative signal applied to the control electrode thereof to become nonconductive to interrupt said current path;
   (b) means associated with said current path for providing a voltage in response to current flow therein;
   (c) a thyratron having a cathode, an anode and a control electrode, said thyratron being normally nonconductive, the control electrode thereof being coupled to said means for providing a voltage, said thyratron being responsive to a predetermined voltage applied to the control electrode thereof to conduct current from the cathode to the anode thereof;
   (d) an induction coil having a primary winding and a secondary winding, said primary winding having a first terminal connected to the cathode of said thyratron, said secondary winding having a first terminal connected to the cathode of said device and a second terminal connected through a diode to the control electrode of said device, said diode being poled to provide a negative signal at the control electrode of said device;
   (e) a capacitor connected from the anode of said thyratron to a second terminal of said primary winding;
   (f) means coupled to said capacitor for providing a charging potential thereto;
   (g) and means coupled to the control electrode of said device for maintaining said negative signal thereat for a predetermined length of time following the application of said negative signal thereto.

5. A control circuit comprising:

(a) a high vacuum electron discharge device having a cathode, an anode and a control electrode, said device being normally conductive to provide a current path between the cathode and anode thereof, said device being responsive to a negative signal applied to the control electrode thereof to become nonconductive to interrupt said current path;

(b) an impedance element connected in series with said current path for providing a voltage in response to current flow therein;

(c) a thyratron having a cathode, an anode and a control electrode, said thyratron being normally nonconductive, the control electrode and cathode thereof being connected across said impedance element, said thyratron being responsive to a predetermined voltage applied to the control electrode thereof to conduct current from the cathode to the anode thereof;

(d) an induction coil having a primary winding and a secondary winding, said primary winding having a first terminal connected to the cathode of said thyratron, said secondary winding having a first terminal connected to the cathode of said device and a second terminal connected through a diode to the control electrode of said device, said diode being poled to provide a negative signal at the control electrode of said device;

(e) a first capacitor connected from the anode of said thyratron to a second terminal of said primary winding;

(f) means coupled to said first capacitor for providing a charging potential thereto;

(g) and a second capacitor connected from the control electrode to the cathode of said device for maintaining said negative signal at the control electrode of said device for a predetermined length of time following the application of said negative signal thereto.

6. A control circuit comprising:

(a) a high vacuum electron discharge device having a filamentary cathode, an anode and a control electrode, said device being normally conductive to provide a current path between the cathode and anode thereof for controlling current flow from an external high voltage supply to an external load, said device being responsive to a negative signal applied to the control electrode thereof to become nonconductive to interrupt said current path;

(b) a resistor connected in series with said current path for providing a voltage in response to current flow from said external high voltage supply to said external load;

(c) a thyratron having a cathode, an anode and a control electrode, said thyratron being normally nonconductive, the control electrode of said thyratron being connected to a first terminal of said resistor and the cathode of said thyratron being connected to a second terminal of said resistor, said thyratron being responsive to a predetermined voltage applied to the control electrode thereof to conduct current from the cathode to the anode thereof;

(d) an induction coil having a primary winding and a secondary winding, said primary winding having a first terminal connected to the cathode of said thyratron, said secondary winding having a first terminal connected to the cathode of said device and a second terminal connected through a diode to the control electrode of said device, said diode being poled to provide a negative signal at the control electrode of said device;

(e) a first capacitor connected from the anode of said thyratron to a second terminal of said primary winding;

(f) means connected to the anode and cathode of said thyratron for charging said first capacitor through said primary winding;

(g) and a second capacitor connected from the control electrode to the cathode of said device for maintaining said negative signal at the control electrode of said device for a predetermined length of time following the application of said negative signal thereto.

References Cited by the Examiner

UNITED STATES PATENTS

| | | | |
|---|---|---|---|
| 1,743,443 | 1/30 | Fearing | 317—51 X |
| 1,938,742 | 12/33 | Demarest | 328—83 |
| 2,530,169 | 11/50 | Lawrence et al. | 317—51 X |
| 2,886,704 | 5/59 | Cole | 328—171 |

SAMUEL BERNSTEIN, *Primary Examiner.*